March 21, 1939.     J. P. VIDMAR     2,151,249
GASOLINE TANK CAP OPERATOR
Original Filed Sept. 6, 1935     2 Sheets-Sheet 1

Inventor
J. P. Vidmar
By Clarence A. O'Brien
Attorney

March 21, 1939.   J. P. VIDMAR   2,151,249
GASOLINE TANK CAP OPERATOR
Original Filed Sept. 6, 1935   2 Sheets-Sheet 2
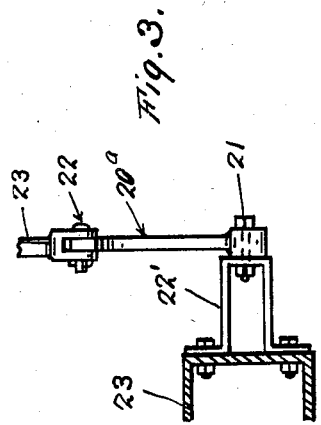
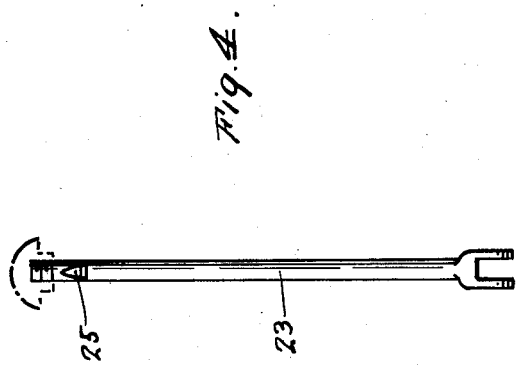
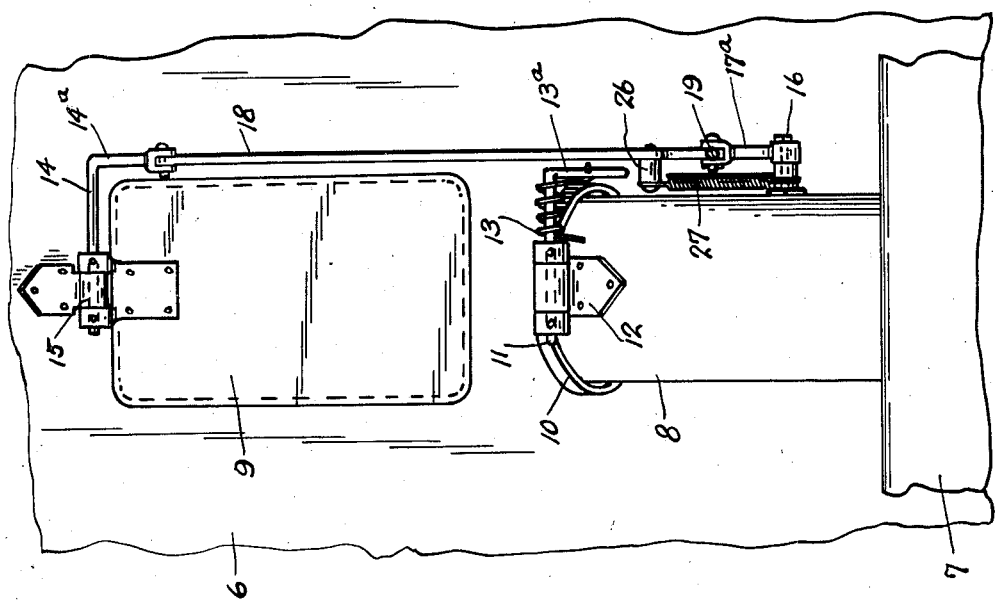
Inventor
J. P. Vidmar
By Clarence A. O'Brien
Attorney Patented Mar. 21, 1939

2,151,249

UNITED STATES PATENT OFFICE 2,151,249

GASOLINE TANK CAP OPERATOR

John Peter Vidmar, Mountain Iron, Minn.

Substitute for application Serial No. 39,486, September 6, 1935. This application December 8, 1938, Serial No. 244,670

5 Claims. (Cl. 296—1)

This invention relates broadly to new and improved means for securing fuel tank caps of motor vehicles against unauthorized removal.

The invention consists in the provision of means whereby the fuel tank cap of present day style of automobiles may be more conveniently manipulated for movement either to an opened or closed position.

This is a substitute application for applicant's abandoned application Serial No. 39,486, filed Sept. 6, 1935.

Further and as will be understood in the present "streamline" or "airflow" design of automobile bodies certain makers of such types of automobile bodies conceal the gasoline tank, and access thereto is had through a suitably provided door in the rear panel of the automobile. The present invention is particularly adapted for such types or designs of automobile bodies, and consists broadly in the provision of remote control means whereby the panel door and the gasoline tank cap may be simultaneously operated to either opened or closed position by the operator of the vehicle without requiring the operator to leave his position within the automobile.

The invention together with its objects and advantages will be best understood from a study of the following description taken in connection with the accompanying drawings wherein:

Figure 2 is an enlarged elevational view further illustrating the invention, certain parts being shown in section.

Figure 3 is an enlarged detail view illustrating certain details of construction hereinafter more fully referred to, and taken substantially on line 3—3 of Figure 1.

Figure 4 is an elevational view of a control means.

Figure 1:
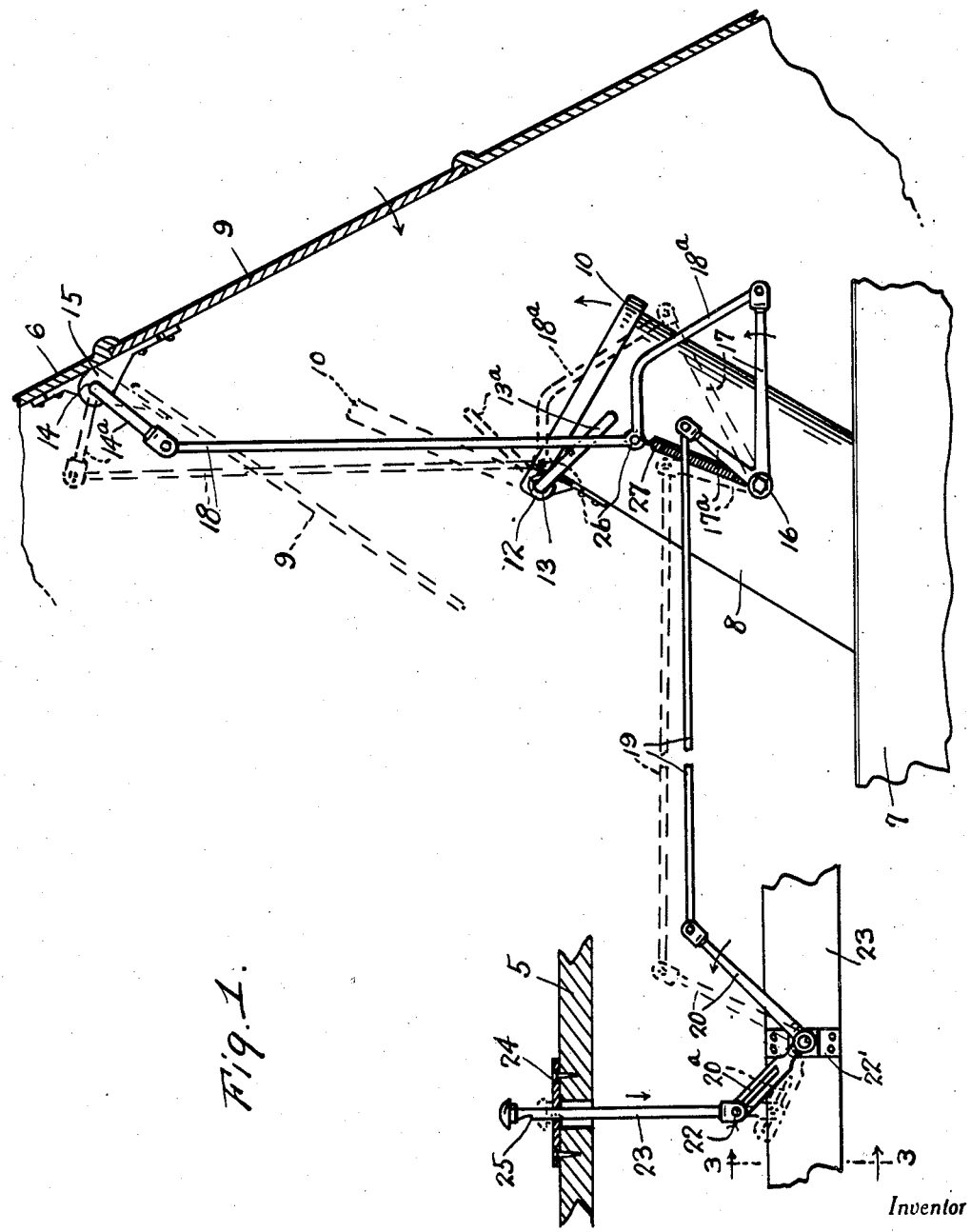
Figure 1 is an enlarged detail view mostly in elevation illustrating the application of the invention.

Referring to the drawings by reference numerals it will be seen that the numeral 5 indicates the floor board of an automobile, the numeral 6 the inclined rear panel for the body of the automobile, the numeral 7 the fuel tank and the numeral 8 the filling neck for the tank. As is well known in the "airflow" or "streamline" body design the rear panel 6 is provided in the region of the gasoline tank neck 8 with an opening normally closed by a door 9 through which access may be had to the gasoline tank.

In accordance with the present invention there is provided for the spout or filling neck 8 of the gasoline tank a cap 10 provided at one end with hinge lugs secured to a hinge pin 11 that is journalled in a fixed hinge sleeve 12 suitably mounted on the spout or filling neck 8. Disposed about an end portion of the hinge pin 11 and having its respective opposite ends engaged with the hinge pin and the spout 8 is a spring 13 that tends to normally urge the cap 10 to a closed position.

Further in accordance with the present invention the panel door 9 is provided with alined hinge ears secured to a hinge pin 14 that is journalled in a fixed hinge ear 15 secured to the inner side of the panel 6. The hinge pin 14 is provided with an arm 14a as shown.

Pivoted as at 16 on one side of the filling neck or spout 8 is a bell crank, one arm of which, indicated by the reference numeral 17 is pivotally connected with the arm 14a of the hinge pin 14 through the medium of an angular shaped link 18. The link 18 as shown is substantially L-shaped and is pivotally connected at the free end of the longer arm with the arm 14a of the hinge pin 14. The other arm of the L-shaped link 18 has its free end downwardly offset as at 18a and suitably connected with the arm 17 of the aforementioned bell crank. The other arm 17a of said bell crank is pivotally connected through the medium of a link 19 with an arm 20 of a second bell crank pivotally mounted as at 21 on a bracket 22 that is secured to and extends laterally from the frame 23 of the automobile.

The other arm of the second mentioned bell crank, which other arm is indicated by the reference numeral 20a has a pin and slot connection 22 with one end of an operating lever or push rod 23. It will thus be seen that movement of the push rod or lever 23 will be transmitted through the link and bell crank connections just described to the door 9 and the tank cap 10 so as to move said door 9 and tank 10 in proper timed relation to each other to an open position whereby access may be had to the gasoline tank.

The push rod 23 is mounted to slide vertically through an opening provided in the floor board 5 of the automobile, and a smaller opening provided in a keeper plate 24 suitably secured to the floor board 5. To releasably retain the push rod or lever 23 in a lowered or downward position, said rod is provided with a suitable notch 25 adapted when the rod 23 moves downwardly to engage an edge of the opening in the plate 24 in a manner thought apparent.

To provide for a delayed movement of the cap 10 to an open position there is provided on the link 18 at the angle between the arms of the link a suitably mounted roller 26. Roller 26 is arranged in the path of an arm 13a provided on one end of the hinge pin 13. Thus it will be seen that as the push rod 23 is moved downwardly to engage the notch 25 thereof with the plate 24 the bell cranks will swing to the dotted line positions shown in Figure 1 thus causing the link 18 to move upwardly. As the link 18 starts on its upward movement roller 26 will engage arm 13a of hinge pin 13 thus causing the latter to rotate in a counter-clockwise direction to swing the cap 10 against the action of spring 13 upwardly toward the dotted line position shown in Figure 1. In this connection however it will be noted that immediately as the bell cranks begin their swinging movement to the dotted positions suggested in Figure 1 motion is transmitted through the link 18 to the door 9 causing the latter to swing inwardly, and when the door 9 has completed a part of the arc upon which it swings roller 26 will then come into engagement with the arm 13a to initiate the upward swinging movement of the cap 10. Thus in this way the swinging movement of the door 9 and cap 10 are so regulated that said door and cap will not interfere with one another in their swinging movement either to open or closed position.

To close the door 9 and effect a return of the cap 10 to a closing position with respect to the spout 8 the operator frees the rod 23. Spring 13 will then act to swing the cap 10 from the dotted line position shown in Figure 1 to the full line position shown in said figure for closing the spout 8 and spring 27 anchored at one end to the pivot 16 and engaged at its opposite end with the axis of the roller 26 will act to return the parts to their normal position, or from the dotted line position shown in Figure 1 to the full line position shown in said figure.

From the foregoing it will be seen that with a device of this character it will be difficult for one to obtain unauthorized access to the gasoline tank, and such access may be controlled by an occupant of the vehicle without requiring the occupant to leave his position within the vehicle.

Having thus described my invention, what I claim as new is:

1. In combination with a fuel tank having a hinged closure, a rear vehicle panel concealing said tank and provided with a hinged door through which access to the tank may be had; remote control means connected with said door and the tank cap for moving said door and cap either to open or closed position, optionally, and including means for effecting a delayed movement of the cap to open position.

2. In combination with a gasoline tank having a hinged cap, a vehicle body panel concealing said tank and provided with a hinged door through which access to the tank is had; mechanism for simultaneously operating said door and cap including a bell crank pivotally mounted on the gasoline tank, link means pivotally connecting said bell crank to the door for transmitting movement of the bell crank to the door, inter-engaging means on said tank cap and said link means for transmitting movement of said bell crank to the tank cap, and operating means connected with said pivoted bell crank.

3. In combination with a gasoline tank having a hinged cap, a vehicle body panel concealing said tank and provided with a hinged door through which access to the tank is had; mechanism for simultaneously operating said door and cap including a bell crank pivotally mounted on the filling neck of the gasoline tank, link means pivotally connecting said bell crank with the door for transmitting movement of the bell crank to the door, inter-engaging means on the tank cap hinge and on said link means for transmitting movement of said bell crank to the tank cap, an operating rod, and motion transmitting means connecting said operating rod with said pivoted bell crank as and for the purpose specified.

4. An operating mechanism for tank caps comprising a hinge pin for the tank cap, spring means engaged with the hinge pin for normally urging the tank cap to a closed position, said hinge pin having an integral arm, a pivotally mounted bell crank, means connected with an arm of said bell crank and movable therewith into engagement with said arm of the hinge pin for swinging said tank cap to an open position, said means being normally free of engagement with the hinge pin arm, a control lever, and motion transmitting means connecting said control lever with a second arm of the bell crank.

5. In combination with a vehicular body rear panel having an opening and a hinged door for said opening, means for swinging said door to an open position including a bell crank, a support behind said panel on which said bell crank is pivotally mounted, a link pivotally connecting one arm of the bell crank with the door hinge for transmitting movement of the bell crank to the door, a control lever, motion transmitting means operatively connecting the control lever with a second arm of the bell crank, and a spring device secured at one end to the pivot for the bell crank and at a relatively opposite end to said link intermediate the ends of said link for yieldably urging said door to a closed position.

JOHN PETER VIDMAR.